United States Patent [19]

Ward et al.

[11] Patent Number: 4,613,509

[45] Date of Patent: Sep. 23, 1986

[54] PROCESS FOR PRODUCING CENTER-FILLED FOOD PRODUCTS

[75] Inventors: Wendell Ward, Carrollton; Surinder Kumar, Plano; Melba Mack, Dallas; Lewis Keller, Watauga; Margaret Fitzwater, Lewisville, all of Tex.

[73] Assignee: Frito-Lay, Inc., Dallas, Tex.

[21] Appl. No.: 618,225

[22] Filed: Jun. 7, 1984

[51] Int. Cl.$^4$ ............................................. A21D 13/00
[52] U.S. Cl. ................................. 426/283; 426/284; 426/503; 426/514
[58] Field of Search ............... 426/282, 283, 284, 138, 426/139, 143, 445–450, 499, 503, 514, 516, 518, 556

[56] References Cited

U.S. PATENT DOCUMENTS

| | | | |
|---|---|---|---|
| 3,450,538 | 6/1969 | McKown et al. | 426/282 |
| 3,462,276 | 8/1969 | Benson | 426/446 |
| 3,477,851 | 11/1969 | Benson et al. | 426/283 |
| 3,538,840 | 1/1969 | Nelson et al. | 426/283 |
| 3,615,675 | 7/1967 | Wisdom et al. | 426/283 |
| 3,666,485 | 4/1964 | Nelson et al. | 426/283 |
| 3,894,159 | 7/1975 | Franta | 426/284 |
| 4,162,333 | 7/1979 | Nelson et al. | 426/283 |
| 4,214,517 | 7/1980 | Caldwell | 426/138 |
| 4,283,430 | 8/1981 | Doster et al. | 426/284 |

OTHER PUBLICATIONS

Abstract of International Publication No. WO/83/02955.

Primary Examiner—Raymond N. Jones
Assistant Examiner—Elizabeth A. King
Attorney, Agent, or Firm—Bernard, Rothwell & Brown

[57] ABSTRACT

A process for producing center-filled food products comprises forming a hollow cylindrical shell of edible material having a single continuous longitudinal slit. The shell is conditioned until it is able to maintain its hollow, cylindrical shape and longitudinal slit without external support, and may subsequently be dried to a shelf stable moisture content. The shell is then filled through the longitudinal slit with an edible food substance which is substantially stable at product storage temperatures. The shell may then be cut to final product size, externally coated with seasoning, and packaged.

21 Claims, 6 Drawing Figures

PROCESS FOR PRODUCING CENTER-FILLED FOOD PRODUCTS

BACKGROUND OF THE INVENTION

1. Field of the Invention

The present invention relates to a process for manufacturing center-filled food products.

2. Description of the Background Art

Center-filled food products are available in great variety and are very popular food items. Examples of such products include candies, pastries and snack items.

Relatively soft and porous pastry items are easily provided with a filling by merely piercing the product with a hollow needle and injecting the filling material. Cream puffs and filled doughnuts are produced in this manner.

Products which are brittle require more sophisticated means of providing a filling. Items such as bread sticks may be filled after baking by boring a hole in the center of the product and then injecting the filling (see, e.g., U.S. Pat. No. 3,666,485 to Nelson et al., May 30, 1972). This is, however, a relatively time-consuming and complicated process.

Snack products can also be made by extruding a hollow shell of an edible material and simultaneously filling the shell from the inside prior to baking (see, e.g., U.S. Pat. No. 3,615,675 to Wisdom et al., Oct. 26, 1971). Such a process is unsuitable for fillings which may be damaged during baking, and generally results in a loss of flavor and texture degradation of fillings which may be used in the process.

Heat degradable fillings may be separately injected into individual extruded hollow dough shells after baking as disclosed in U.S. Pat. No. 4,162,333 to Nelson et al., but such a process is relatively more time-consuming and expensive than a continuous process.

There thus remains a need for a more efficient and less expensive method of filling hardened shells to make center-filled food products.

SUMMARY OF THE INVENTION

In accordance with the present invention, a process for producing a center-filled food product comprises forming a hollow cylindrical shell of edible material wherein the shell has a single continuous longitudinal slit, conditioning the shell so that it will maintain its hollow cylindrical shape and longitudinal slit without additional support, and filling the hollow shell through the longitudinal slit with an edible food substance which is substantially stationary at product storage temperatures.

DETAILED DESCRIPTION OF THE PREFERRED EMBODIMENTS

The present invention relates to a process for producing center-filled food products using an edible formable material. The formable material may be any edible product, which may be used to form a shell. Preferred shell-making materials are made using farinaceous products, e.g., meal, flour, or starch-based mix. Meals or flours which are suitable for use according to the invention include those made from rice, oats, corn, wheat, potatoes, legumes, and the like, or mixtures thereof.

Sufficient moisture is mixed with the meal or flour to make a material which is capable of being formed into a shell. The water is added prior to introduction into the extruder, after introduction into the extruder, or both. Other ingredients may optionally be added to the mixture to alter the flavor, texture, and/or appearance of the product. Additional control of texture, expansion, and uniformity of cell size is especially desirable. This can be accomplished by adding leavening agents to the mixture, or by introducing a gas directly into the thermoplastic mixture while it is in the extruder. Leavening agents, such as a combination of monocalcium phosphate and sodium bicarbonate, can be added to the mixture; or a gas, such as carbon dioxide, can be introduced into the extruder barrel.

Figure 1:
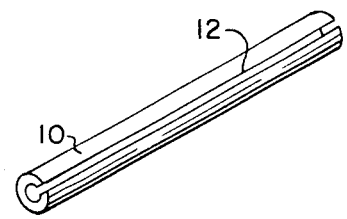
FIG. 1 is a perspective view of an unfilled shell, having a cross section shaped like the letter "C", formed in accordance with the present invention.

With reference to FIG. 1., the shell-making material is formed into a hollow, cylindrical shell 10 with a continuous longitudinal slit 12. The slitted cylindrical shell 10 may be formed by extrusion, by rolling the mixture into a sheet and then forming the slitted shell 10, or by otherwise forming the shell 10. In preferred embodiments, the shell-making material is extruded to form the slitted shell 10, and it is particularly preferred that the shell be formed using a continuous extrusion process.

The external diameter of the shell 10 may be any desired size consistent with the characteristics of the mix formulation employed. The slit 12 must be wide enough to permit injection of a filling, yet narrow enough to retain the filling in the finished product and prevent separate pieces from interlocking together. For example, for shells of approximately 7/16" to 9/16" diameter, a slit width of 5/64" to 3/32" is preferable. As a general rule, the slit width is less than the wall thickness.

After the hollow shell 10 is extruded, it may be necessary to further form and condition the shell 10 to enable it to maintain its hollow cylindrical shape and longitudinal slit 12 unsupported. Conditioning is a process in which the shell is exposed to moving air, under controlled velocity and temperature conditions, for the length of time required for the shell to become rigid. During conditioning, it may be necessary to externally support the shell 10 to maintain the desired shape or restrict deformation, but this may not be necessary if a shell-making formulation is employed which is of a consistency such that the desired shape of the shell 10 is maintained after forming. If necessary, the shell 10 may be further dried to shelf-stable moisture content using any conventional method, e.g., baking, frying, microwave drying, air drying, and the like, but baking is the preferred method. In general, a shelf-stable moisture content is about 2% moisture by weight or less.

The dried hollow shells 10 are then filled with an edible food substance through the longitudinal slit 12. The filling may be any pumpable food substance which is substantially stable at product storage temperatures, such as cheese (e.g., nacho or cheddar), Mexican bean dip, California onion dip (sour cream and onion), peanut butter, fruit filling, chocolate composition and the like. Alternatively, the shell may be filled with a pumpable chilled filling such as ice cream, with the product being stored below ambient temperatures. Fillings which are substantially stable at ambient temperatures are particularly preferred.

The side walls of the shells 10 may be any desired thickness consistent with the characteristics of the shell material and filling formulations employed.

The filled shells may then be cut to the finished product size with optional application of a seasoning or topical coating to enhance the product flavor, texture and/or appearance.

The present invention is particularly well suited for the manufacture of center-filled puff-extruded snack food products. Puff extrusion processes are well known in the art, and require the use of a puff extrudable edible material usually having a moisture content of from about 15% to about 25% by weight. The shell-making material is fed into a cooking extruder and heated at least to the boiling point of the liquid present in the mixture. The moisture is not allowed to escape as the mixture cooks, resulting in superatmospheric pressure developing within the extruder. When the mixture is discharged through the extruder die and exposed to a reduced pressure, such as atmospheric pressure, the moisture readily vaporizes to form a highly porous, puffed, multi cellular body.

Figure 2:
FIG. 2 is an end elevation view of a conventional tubular shell extrusion die modified by attachment of a knife edge on the external face of the die, the knife being positioned to split the extrudate.

Referring to FIG. 2, in one embodiment of the present invention, an extruder die 14 is used which forms a tubular shell 10 from the extrudate. The tubular extrudate is split by a knife edge 16 upon exit of the die orifice 18 to form a continuous longitudinal slit 12 in the shell 10.

Figure 3:
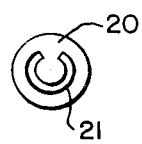
FIG. 3 is an end elevation view of a C-shaped extrusion die for use in accordance with the invention.

Referring now to FIG. 3, in another embodiment of the invention, the thermoplastic mixture is extruded through die 20 having a C-shaped orifice 21 and exits the extruder as a split cylindrical (or C-shaped) shell 10.

Figure 4:
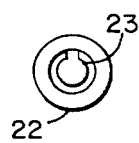
FIG. 4 is an end elevation view of a two-piece extrusion die with a round center insert having a key-shaped protrusion for use in accordance with the invention.

Referring to FIG. 4, in another embodiment of the invention, the shell-making material is extruded through the annular orifice 22 of a two-piece die. A smaller key-shaped insert 23 is nested within the orifice 22 such that the extrudate exits the die face as a C-shaped shell 10.

Figure 5:
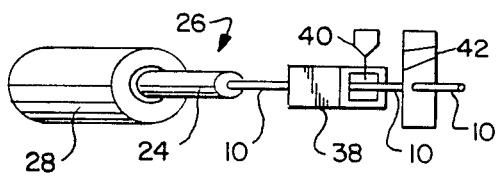
FIG. 5 is a schematic diagram of extrusion, forming, drying, filling and cutting apparatus for use in accordance with the process of this invention.

Referring to FIG. 5, when puff-extruded shells 10 are produced according to the present invention, it is preferable that the extrudate shell 10 be transported through a forming attachment 24 extending from the die 26, and external of the extruder 28. The die 26 may be of such configuration as depicted in FIG. 2, FIG. 3., or FIG. 4. The forming attachment 24 controls the direction of expansion of the shell 10 as it expands due to vaporization, and maintains the C-shape of the shell 10 to desired dimensions.

Figure 6:
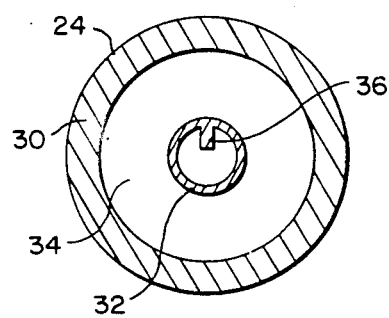
FIG. 6 is a cross-sectional view of a forming apparatus suitable for use according to the invention.

Referring now to FIG. 6, the forming attachment 24 has a main housing 30 and a shell guide 32. Air is passed through a space 34 between the main housing 30 and the shell guide 32. The extruded shell 10 passes through an inner surface of the shell guide 32. The longitudinal slit 12 of the shell 10 is maintained by the rail 36 which extends longitudinally along the inner surface of the shell guide 32. Air passes to the shell 10 through the shell guide 32 and the rail 36 from space 34. The air may be of ambient temperature or may be heated to aid in drying the shell. Depending on the desired end product, the shell 10 may be rendered sufficiently dry after passing through the forming attachment 24 so as not to require further drying. Alternatively, this forming step may not be necessary if the extrudable formulation employed is of a consistency after extrusion such that the desired shape of the shell 10 is maintained after extrusion.

Referring back to FIG. 5, when puff extruded snack products are produced, the extruded shell 10 is preferably continuously dried in an oven 38 by a conventional high velocity-high temperature air unit operation. Alternatively, the extruded shell 10 may be cut into logs of a length suitable to the configuration of a conventional oven and therein dried. The moisture content of the shells 10 is preferably reduced to about 2% by weight or less.

The dried shell 10 is then filled continuously through the slit 12 utilizing a conventional pressurized, constant flow injection apparatus 40. The filled shell 10 is finally gang cut to a finished product size using conventional cutting apparatus (not illustrated). This step is preceded by a fly cut of the filled shell 10 by conventional cutting means 42, if the preferred continuous shell drying technique described above is employed. The finished product may be of any desired size, such as bite-size or bread stick size, and the cutting angles may be varied to obtain desired appearance, including cuts made perpendicular to the long axis of the shell or cuts made at some angle other than 90°. Bite-size pieces are particularly preferred. Optionally, a seasoning or coating may be applied to the final product prior to packaging.

The present invention provides a process for producing center-filled food products which is less costly, more efficient, and requires fewer steps than previously known bore and fill methods. The invention further provides for the use of heat-degradable fillings not appropriate for use with previously known methods of filling shells prior to cooking.

EXAMPLE I

A mix is made up of the following formulation: corn flour (96.5%), soy oil (1.5%), monocalcium phosphate/sodium bicarbonate (2%), the approximate proportions of the ingredients by weight being set forth within the parentheses. Water is added to the above mix to obtain 15% water by weight, and the mix is then introduced into cooking extruder model Wenger X-20. Sufficient additional water is then added to produce a puff extrudable mixture. The extruder develops a temperature of 270° F. and a pressure of 1450 p.s.i.g. at its outlet end. The formulation is extruded through a die (a 3/64" wide circular-shaped hole milled to complete 300° of a full circle, with a maximum radius of $\frac{1}{8}$" from the center point) and the slit width is maintained after extrusion by carrying the shell over a 15" air-forming rail at a rate of 150 ft/min. After passing over the rail, the extruded shell is continuously dried by a conventional high velocity-high temperature air drying unit until the moisture content of the shell is about 2% or less. The dried shell is then filled continuously with peanut butter or cheese utilizing a conventional pressurized, constant flow injection apparatus. The filled shell is then fly cut to a length of $5\frac{3}{4}$", and these lengths are then gathered and gang cut to a length of 1⅛" to form bite size pieces. The pieces are then coated with seasoning and oil and packaged.

EXAMPLE II

A mix is made up of the following formulation: corn meal (67%), potato flakes (30.7%), monocalcium phosphate/sodium bicarbonate (2%), salt (0.2%), and coloring (0.04%), the approximate weight percentages being indicated within the parentheses. Water is added to this mix to obtain 15% by weight water, and the mix is then introduced into cooking extruder model Wenger X-20. Sufficient additional water is then added to produce a puff extrudable mixture. The extruder develops a temperature of 200° F. and a pressure of 1500 p.s.i.g. at its outlet end. The formulation is extruded through a die (a 3/64" wide circular-shaped hole milled to complete 300° of a full circle, with a maximum radius of ⅛" from the center point) and the slit width is maintained after extrusion by carrying the shell over a 15" air-forming rail at a rate of 150 ft/min. After passing over the rail, the extruded shell is continuously dried by a conventional high velocity-high temperature air drying unit until the moisture content of the shell is about 2% or less. The dried shell is then filled continuously with peanut butter or cheese utilizing a conventional pressurized, constant flow injection apparatus. The filled shell is then fly cut to a length of 5¾", and these lengths are then gathered and gang cut to a length of 1⅛" to form bite size pieces. The pieces are then coated with seasoning and oil and packaged.

EXAMPLE III

A mix is made up of the following formulation: whole wheat flour (90%), corn meal (9.97%), and coloring (0.03%), the approximate weight percentages being indicated within the parentheses. The mix is then introduced into cooking extruder model Wenger X-20, and sufficient water is added to produce a puff extrudable mixture. The extruder develops a temperature of 210° F. and a pressure of 1100 p.s.i.g. at its outlet end. The formulation is extruded through a die (a 3/64" wide circular-shaped hole milled to complete 300° of a full circle, with a maximum radius of ⅛" from the center point) and the slit width is maintained after extrusion by carrying the shell over a 15" air-forming rail at a rate of 150 ft/min. After passing over the rail, the extruded shell is continuously dried by a conventional high velocity-high temperature air drying unit until the moisture content of the shell is about 2% or less. The dried shell is then filled continuously with peanut butter or cheese utilizing a conventional pressurized, constant flow injection apparatus. The filled shell is then fly cut to a length of 5¾", and these lengths are then gathered and gang cut to a length of 1⅛" to form bite size pieces. The pieces are then coated with seasoning and oil and packaged.

Although the invention has been particularly described with reference to puff extruded products, it will be recognized by persons skilled in the art that many modifications may be made in the process, and different alternatives employed, which will fall within the scope of the invention. It is therefore to be understood that the invention is to be limited only by the scope of the claims.

What is claimed is:

1. A process for continuously producing a center-filled food product comprising the following steps in sequence:
   (a) continuously forming a hollow cylindrical shell of edible material, and simultaneously continuously forming a single continuous open longitudinal slit in the shell;
   (b) drying said shell until it is rigid and self-supporting for receipt of a filling;
   (c) continuously filling after drying said shell during movement thereof through said open longitudinal slit with an edible food substance which is substantially stable at product storage temperatures;
   (d) then cutting the filled shell into pieces.
2. The process of claim 1 wherein said edible food substance is a pumpable edible food substance which is semi-solid and substantially stable at ambient temperatures.
3. The process of claim 1, wherein said edible material contains a meal or flour made from a product selected from the group consisting of rice, oats, corn, wheat, potatoes, legumes, and mixtures thereof.
4. The process of claim 2, wherein said shell is formed by extrusion of said edible material.
5. The process of claim 4, wherein said shell is extruded by a cooking extruder.
6. The process of claim 5, wherein said edible material is a puff extrudable edible material which is cooked in said cooking extruder under puffed food product cooking conditions to a temperature and pressure at which said edible material puffs upon reaching atmospheric pressure after extrusion.
7. The process of claim 6 wherein additionally external means are employed immediately after extrusion which support said shell until said shell is self-supporting.
8. The process of claim 6, wherein said puff extrudable edible material contains from about 15% to about 25% moisture by weight.
9. The process of claim 8, wherein additionally external means are employed which maintain the dimensions and shape of said shell immediately after extrusion.
10. The process of claim 9, wherein additionally said shell is dried to a shelf-stable moisture content by baking.
11. The process of claim 9 wherein additionally said external means are employed to support said shell until said shell is self-supporting.
12. The process of claim 11, wherein additionally said shell is dried to a shelf-stable moisture content by baking.
13. The process of claim 11 wherein said external means support said shell by air during said drying.
14. The process of claim 13, wherein additionally said shell is dried to a shelf-stable moisture content by baking.
15. The process of claim 14, wherein said pumpable, edible food substance is continuously injected into said dried shell after baking.
16. The process of claim 15, wherein said dried shell is cut into product-size pieces after injecting said pumpable, edible food substance.
17. The process of claim 2, wherein said pumpable, edible food substance is cheese, peanut butter, bean dip, onion dip, fruit jam or chocolate composition.
18. The process of claim 16, wherein said pumpable, edible food substance is cheese, peanut butter, bean dip, onion dip, fruit jam or chocolate composition.

19. The process of claim 18, wherein said shell is dried to less than about 2% by weight moisture content by baking.

20. The process of claim 19, wherein said pieces are coated with an edible flavoring product.

21. A process for producing a center-filled food product comprising:

(a) continuously extruding an extrudable edible material to form a continuous hollow cylindrical shell with a single continuous longitudinal slit therein;
(b) continuously drying the extruded shell until it is self-supporting and has a shelf-stable moisture content;
(c) continuously injecting into the dried shell through said longitudinal slit a pumpable, edible food substance which is semi-solid and substantially stable at ambient temperatures; and
(d) cutting the filled shell into product-size pieces.

* * * * *